US008904768B2

United States Patent
Lu et al.

(10) Patent No.: US 8,904,768 B2
(45) Date of Patent: Dec. 9, 2014

(54) ADAPTIVE DESULFATION AND REGENERATION METHODS FOR LEAN NOX TRAP

(75) Inventors: Qilong Lu, San Antonio, TX (US); Shizuo Sasaki, San Antonio, TX (US); Yiqun Huang, Katy, TX (US)

(73) Assignee: Southwest Research Institute, San Antonio, TX (US)

( * ) Notice: Subject to any disclaimer, the term of this patent is extended or adjusted under 35 U.S.C. 154(b) by 1089 days.

(21) Appl. No.: 12/906,115

(22) Filed: Oct. 17, 2010

(65) Prior Publication Data

US 2012/0095666 A1    Apr. 19, 2012

(51) Int. Cl.
*F01N 3/00* (2006.01)
*F01N 3/10* (2006.01)
*F01N 3/08* (2006.01)

(52) U.S. Cl.
CPC ....... *F01N 3/0885* (2013.01); *F01N 2900/0601* (2013.01); *F01N 2900/1612* (2013.01); *F01N 2900/1614* (2013.01); *Y02T 10/20* (2013.01)
USPC .................. 60/301; 60/274; 60/277; 60/285

(58) Field of Classification Search
USPC ............................. 60/274, 277, 285, 295, 301
See application file for complete search history.

(56) References Cited

U.S. PATENT DOCUMENTS

| | | | |
|---|---|---|---|
| 2007/0028602 A1* | 2/2007 | Dalla Betta et al. | 60/286 |
| 2007/0256405 A1* | 11/2007 | Gabe et al. | 60/274 |
| 2008/0104947 A1* | 5/2008 | Wang et al. | 60/295 |
| 2009/0171553 A1* | 7/2009 | Audouin et al. | 701/108 |

* cited by examiner

*Primary Examiner* — Audrey K Bradley
(74) *Attorney, Agent, or Firm* — Chowdhury & Georgakis, P.C.; Ann C. Livingston

(57) ABSTRACT

An adaptive method is used for LNT desulfation and regeneration. The desulfation method involves adapting the amount of sulfur loading to trigger a desulfation event in accordance with the current adsorption capacity of the LNT. The method involves monitoring the current sulfur loading and the current LNT adsorption capacity. This data is used to calculate a loading amount "trigger", whose value varies over the LNT lifetime. Whenever this trigger amount is reached, a desulfation event is performed. The regeneration method is similar, with the baseline data and loading threshold being determined by NOx loading rather than sulfur loading.

8 Claims, 4 Drawing Sheets

US 8,904,768 B2

ADAPTIVE DESULFATION AND REGENERATION METHODS FOR LEAN NOX TRAP

TECHNICAL FIELD OF THE INVENTION

This invention relates to emissions control devices, and more particularly to methods of desulfation and regeneration of a lean NOx trap.

BACKGROUND OF THE INVENTION

Diesel emission standards for vehicle engines are becoming increasingly stringent. It has been impossible to meet emissions legislations by merely relying on the diesel engine itself.

Thus, various exhaust aftertreatment devices have played an essential role in engine emission technologies. Diesel particulate filters (DPF) are in common use for particulate matter (PM) control, and lean NOx traps (LNT) are used for NOx control in light-duty diesel applications. In addition to diesel applications, LNT's can be used with lean burn gasoline engines.

Under lean conditions, an LNT adsorbs oxides of nitrogen (NOx) produced from engine combustion. The adsorption process generally involves two steps. First, engine-out nitric oxide (NO) reacts with oxygen to form nitrogen dioxide (NO2) on an active oxidation catalyst (such as platinum). Second, the NO2 is adsorbed in the form of nitrates by a storage material (such as barium oxide). The LNT may be regenerated under rich conditions, whereby NOx is released and reduced to N2 over a reduction catalyst (such as rhodium).

Sulfur poisoning is a particularly challenging problem for LNT devices. Lean-burn engine exhaust contains oxides of sulfur (SOx), derived from fuel and lubricating oil, which compete with NOx for LNT adsorption sites. Unfortunately, SOx is preferentially adsorbed over NOx and forms stable sulfates with the LNT storage materials. As a result, LNT performance gradually declines because fewer storage sites are available for NOx adsorption.

Even if ultra low sulfur fuel is used, without effective sulfur management, an LNT can be fully de-activated over time. To effectively manage sulfur poisoning, high temperature desulfation is periodically performed. Desulfation requires a high temperature exhaust (e.g. 650° C.) and rich conditions to release sulfur from the LNT adsorption sites.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to an "adaptive desulfation frequency control" method for performance improvement of a lean NOx trap (LNT) under conditions of sulfur poisoning and thermal deterioration. The method achieves the maximum NOx adsorption capacity of the LNT during the LNT's useful lifetime. As explained below, the method controls the frequency and triggering of LNT desulfation events.

An analogous method can be applied to LNT regeneration. These methods provide an optimal NOx capacity management scheme for any LNT used for emissions control of an internal combustion engine. Although the following description is written mostly in terms of managing NOx absorption capacity as affected by sulfur loading, the method of managing NOx absorption capacity for regeneration purposes is also described.

As stated in the Background, sulfur loading on an LNT can deactivate the LNT's NOx adsorption capacity. Typically, high temperature is used to release sulfur from the adsorption sites. However, increasing LNT temperature from a normal operating temperature range (about 200° C. to 500° C.) to the very high desulfation temperature (above 650° C.) will cause severe thermal degradation of LNT performance. At high temperatures, an LNT's catalyst metals and its washcoat can severely sinter. This thermal sintering results in less catalyst surface area and causes the decline of LNT adsorption capacity.

The goal of a desulfation event is to release active adsorption sites from sulfur poisoning and to restore NOx adsorption capacity. Unfortunately, desulfation cannot always restore full NOx adsorption capacity, and thermal degradation of LNT caused by the desulfation process can result in significant capacity reduction. Despite concern for LNT durability, desulfation is unavoidable because excessive sulfur loading can create irreversible sulfur poisoning, a condition that must be avoided.

Thermal degradation dominates LNT performance degradation during the first few desulfation events. After that period, the capability of active adsorption sites restored through desulfation events will be more significant than other types of negative impacts such as thermal sintering, catalyst fouling, and residual element poisoning. Catalyst fouling is caused by physical deposition of exhaust species (e.g. unburned hydrocarbon) onto the catalyst surface areas. Residual poisoning elements (e.g. P, Zn, Ca, and Mg) are mostly associated with lubricating oil. Fouling and poisoning always exist, but thermal degradation and sulfur poisoning have more significant impact on LNT NOx adsorption capacity.

Figure 1:
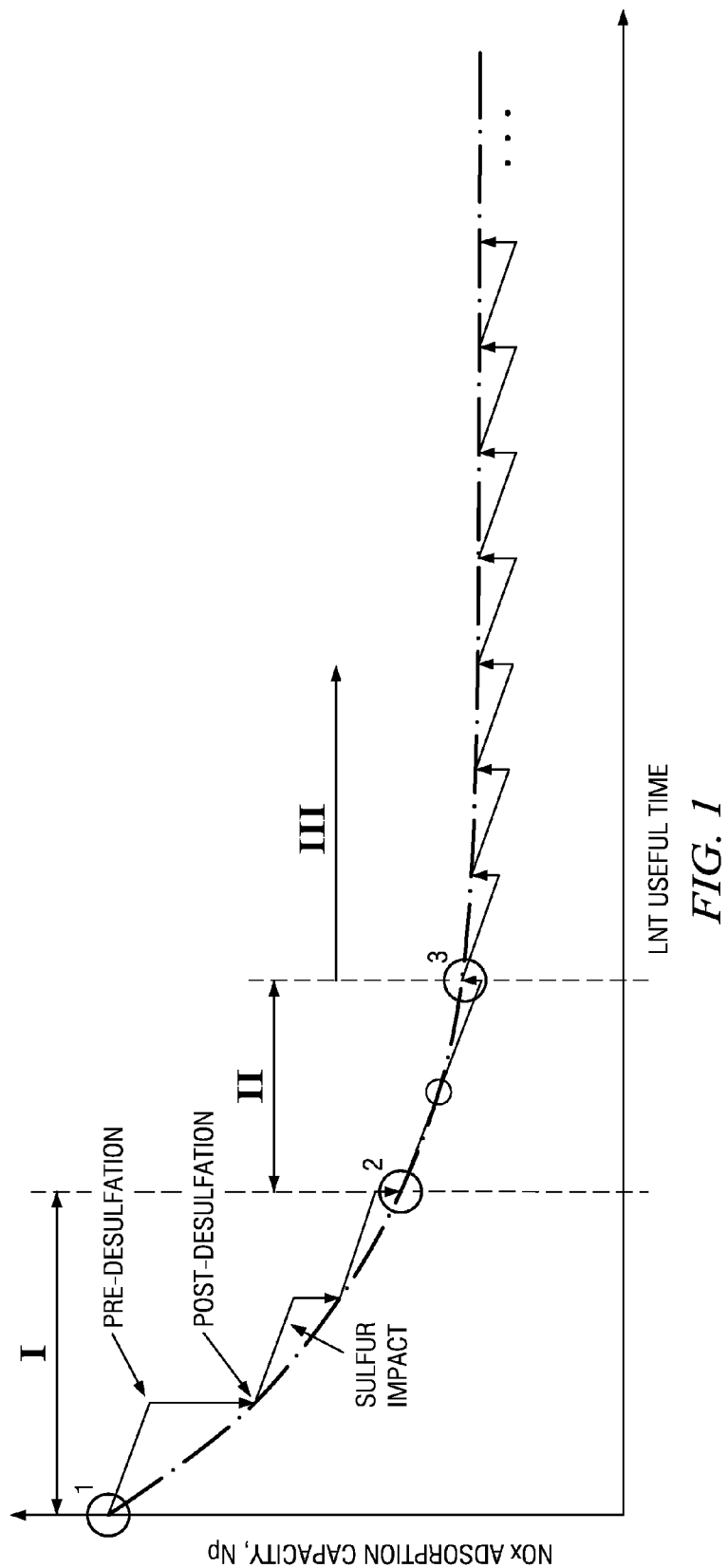
FIG. 1 illustrates an example of the declining adsorption capacity of an LNT over its lifetime, assuming conventional desulfation.

FIG. 1 illustrates an example of how the NOx adsorption capacity of an LNT declines over its useful lifetime. A program of conventional desulfation events is assumed, that is, the engine is programmed to undergo a series of desulfation events, each triggered by a predetermined and constant (fixed) sulfur loading amount. The amount of sulfur loading undergone by an LNT at any given time may be determined by various techniques, and generally involves estimating sulfur loading from the amount of fuel and oil consumed by the engine.

For each desulfation event, a "pre-desulfation" capacity point is reached at which the LNT's sulfur loading reaches a predetermined value. During desulfation, the engine operating conditions are controlled to achieve the high temperature and rich conditions needed for desulfation. A "post desulfation" capacity point represents the capacity after that desulfation event. The "sulfur impact" results in diminished capacity until the next "pre-desulfation" capacity point is reached.

The solid lines illustrate how NOx adsorption capacity changes with sulfur poisoning and a succession of desulfation events. The dashed line is an approximation curve of the solid lines.

A fresh LNT has the highest NOx adsorption capacity as indicated by Point 1. However, after a few desulfation events, its capacity drops dramatically as indicated by Point 2. The zone between Point 1 and Point 2 is identified as Zone I, in which the thermal sintering impact caused by desulfation events dominates all other impacts (such as desulfation restoration).

After Point 2, LNT adsorption capacity continues decreasing due to thermal degradation caused by desulfation events, but at a lower rate than in Zone I. The zone between Point 2 and Point 3 is defined as Zone II, in which thermal degradation roughly balances with the desulfation restoration.

From Point 3, the LNT's NOx adsorption capacity remains quite stable with desulfation events. The absorption capacity decreases at a much slower rate because the catalyst metals and washcoat have been well sintered, but does continue to decrease gradually because of the negative impacts from the catalyst fouling and poisoning by residual elements. The working zone after Point 3 is defined as Zone III, in which the adsorption capacity restoration from desulfation events dominates all other minor negative impacts, such as physical fouling and residual elements poisoning. Zone III is a relatively stable zone, and the LNT will operate in this zone for most of its useful lifetime.

The shape of the NOx absorption capacity curve illustrated in FIG. 1 is a result of a "conventional" sulfur management method. This method uses a fixed amount of sulfur loading as the desulfation trigger to start a desulfation. The amount of sulfur loading is determined by results obtained with an aged LNT that is working in Zone III. The conventional method emphasizes effectively making use of adsorption capacity of an aged LNT, based on the fact that the LNT will enter this zone sooner or later and that the LNT will work in this zone for most of its useful life.

A feature of the adaptive desulfation method described herein is the recognition that a shortcoming of the conventional desulfation method is that the LNT does not use its higher adsorption capacity in Zone I and Zone II. An optimal desulfation control method should effectively use these higher adsorption capacity zones. The adaptive desulfation method described herein balances the conflict between thermal degradation and desulfation so as to maximize potential LNT adsorption capacity during the LNT useful life.

As illustrated in FIG. 1, thermal degradation caused by desulfation events is dominant in Zone I and Zone II. Meanwhile, in these zones, the LNT has more active available adsorption sites than that of an aged LNT in Zone III. That means an LNT operating in Zone I and Zone II can tolerate more sulfur loading than an aged LNT in Zone III.

Figure 2:
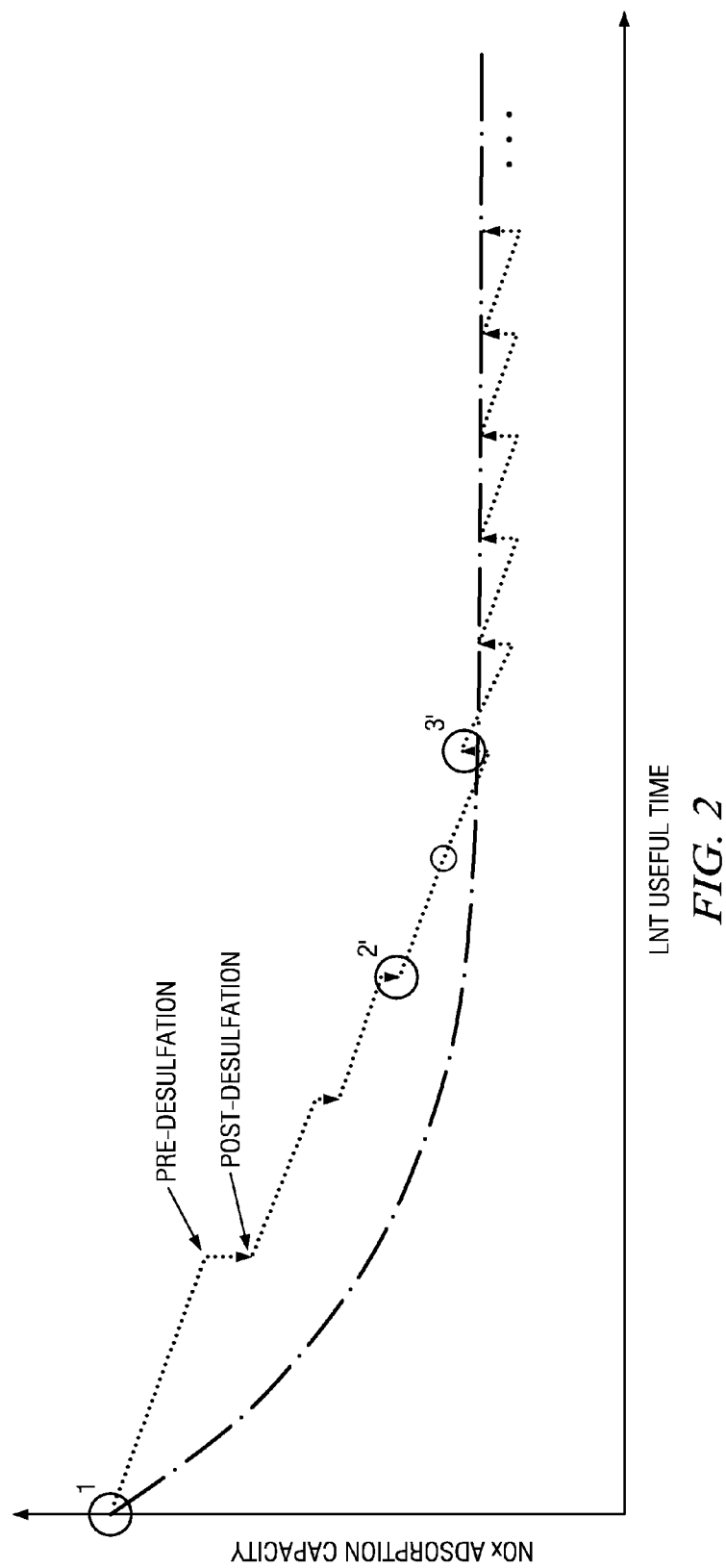
FIG. 2 illustrates an adaptive desulfation method.

FIG. 2 illustrates an adaptive desulfation method. This method decreases desulfation frequency during Zones I and II, so that thermal deterioration can be reduced accordingly. On the other hand, when the LNT has a lower adsorption capacity in Zone III, the desulfation frequency is increased adaptively. That is, under different LNT working conditions (fresh, de-greened, aged with certain times of desulfations, etc.), the desulfation trigger (when to start a desulfation) is determined by different amounts of sulfur loading on the LNT. The bigger adsorption capacity the LNT has, the more sulfur loading it can tolerate and a longer interval should be used between two consecutive desulfations.

Figure 3:
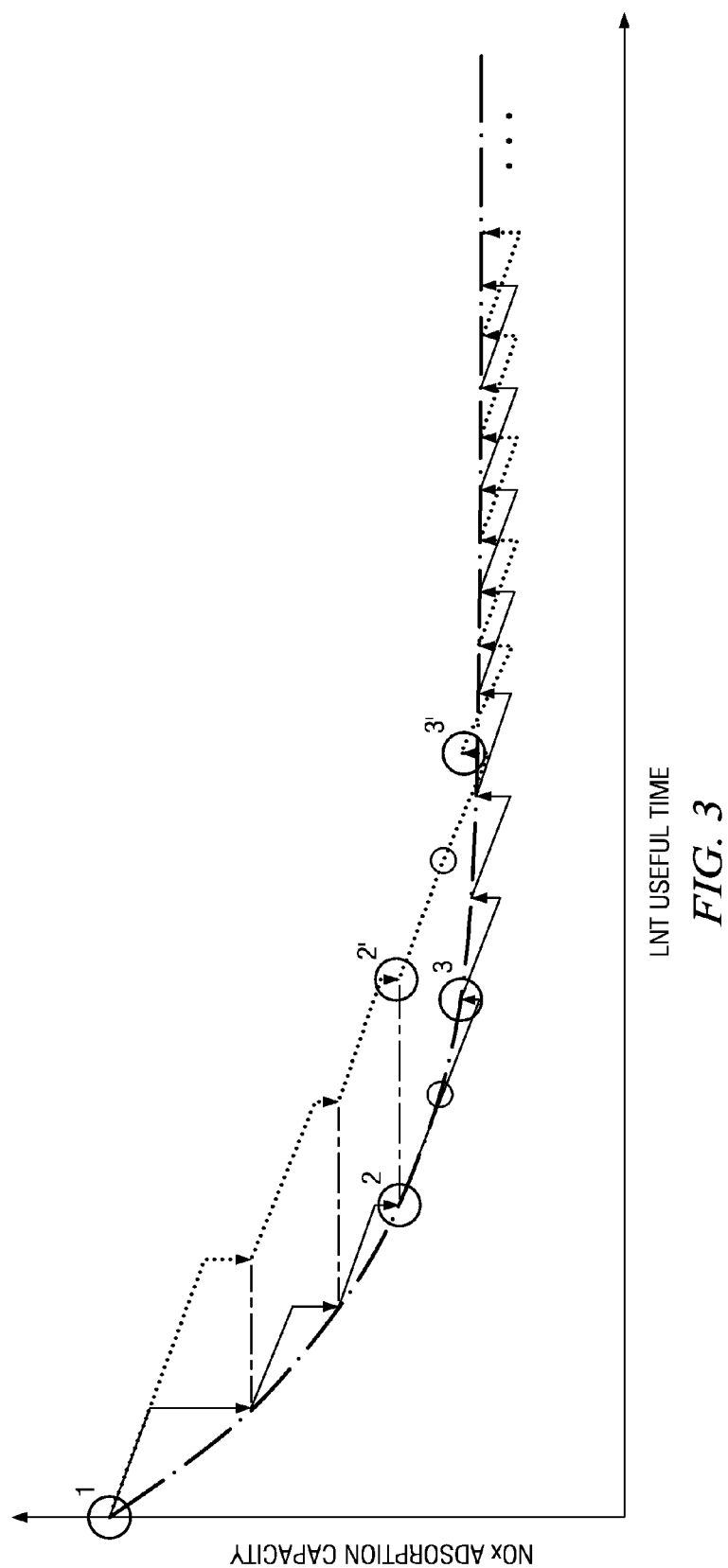
FIG. 3 illustrates how the conventional LNT adsorption capacity curve is improved by using the adaptive sulfur management method.

FIG. 3 illustrates how the conventional adsorption capacity curve is improved by using the adaptive sulfur management method. Other than the triggering conditions, the same exhaust flow rate, exhaust lean and rich conditions, exhaust rich duration, LNT temperature level, etc., are assumed to be used to compare the two different desulfation control methods. The adaptive desulfation method results in higher adsorption capacity for the LNT than does the conventional strategy before the LNT reaches the Point 3 and Point 3'. Also, Zones I and II are extended. This helps the LNT achieve the maximum potential NOx adsorption capacity over its useful life.

In general, the adaptive desulfation method involves adapting the amount of sulfur loading to trigger a desulfation event in accordance with the current adsorption capacity of the LNT. The method involves monitoring the current sulfur loading and the current NOx adsorption capacity. This data is used to calculate a sulfur loading amount "trigger", whose value varies over the LNT lifetime. Whenever this trigger amount is reached, a desulfation event is performed. A specific implementation is described below.

Figure 4:
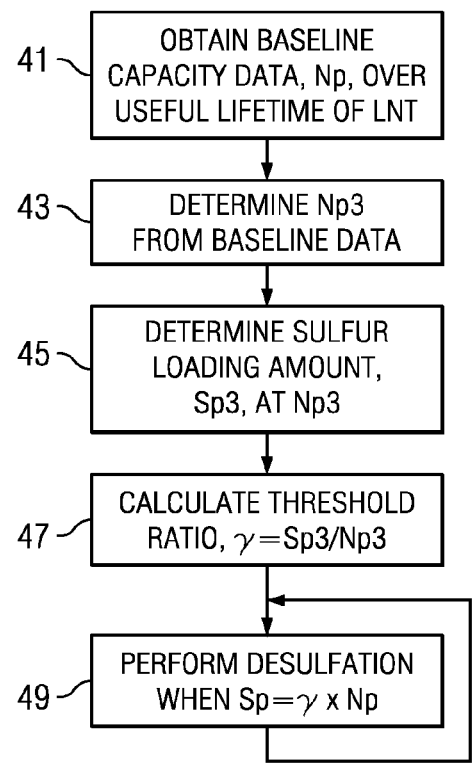
FIG. 4 illustrates a method of acquiring data for use in the control method.

FIG. 4 illustrates an adaptive desulfation method in accordance with one embodiment of the invention. Referring again to both FIGS. 1 and 4, the method is premised on classifying the LNT adsorption capacity into zones over the useful life of the LNT. In Zone I, thermal degradation impact caused by high-temperature desulfations dominates all other impacts (e.g. desulfation restoration, etc.). In Zone II, thermal degradation roughly balances with the desulfation restoration. In Zone III, the adsorption capacity restoration from desulfations dominates all other minor negative impacts.

In Step 41, for a selected LNT, baseline NOx adsorption capacity data, representing the LNT's NOx adsorption capacity over its working lifetime is established. This data assumes a conventional desulfation strategy, and may be measured, estimated from a model, or obtained by other suitable means. The baseline data may be similar to the adsorption capacity curve of FIG. 1. Under typical engine operating conditions and duty cycles, representative LNT bed temperature, space velocity, and engine out NOx concentration level are considered to obtain this baseline data. Once the baseline data is determined, at any point in time during the LNT's useful lifetime, an adsorption capacity value, Np, may be obtained from the baseline data.

In Step 43, from the baseline capacity data, the capacity, Np3, at Point 3 (the beginning of Zone III) is determined. Referring again to FIG. 1, Point 3 is the time at which the LNT's desulfation restoration dominates over additional thermal degradation. This point may also be referred to as the capacity at which the LNT undergoes "positive restoration" as a result of the desulfation. Np3 is the LNT's adsorption capacity at this point in time.

In Step 45, an amount of sulfur loading, Sp3, appropriate to trigger a desulfation event is determined for this point. For example, criterion for determining the sulfur loading amount, Sp3, could be that substantially all sulfur-occupied adsorption sites can be restored effectively by desulfation. That also means no LNT capacity loss due to excessive sulfur loading (irreversible sulfur poisoning).

In Step 47, a threshold ratio, $\gamma$, is calculated from the following equation:

$$\gamma = \frac{S_{p3}}{N_{p3}}$$

In Step 49, the sulfur loading of the LNT is monitored, and desulfation is performed at any time an adaptively calculated trigger amount, Sp, is reached. More specifically, after the threshold ratio, γ, is calculated, the amount of sulfur loading that triggers a desulfation event for any point of the average LNT capacity curve can be calculated. Regardless whether the LNT is fresh or it has experienced a certain number of desulfations, the NOx adsorption capacity, Np, for the current working point can be obtained from the baseline data. Then, the sulfur loading, Sp, for triggering the next desulfation is determined by the following equation:

$$S_p = \gamma \times N_p$$

The above-described adaptive desulfation method controls the frequency of desulfation by adaptively calculating desulfation trigger amounts. These trigger amounts are not necessarily constant throughout the life of the LNT. The method optimally balances thermal impact and sulfur impact on LNT $NO_x$ adsorption capacity. The method is a sulfur management strategy which can be used to achieve maximum potential $NO_x$ adsorption capacity over the whole LNT useful life of the LNT.

Figure 5:
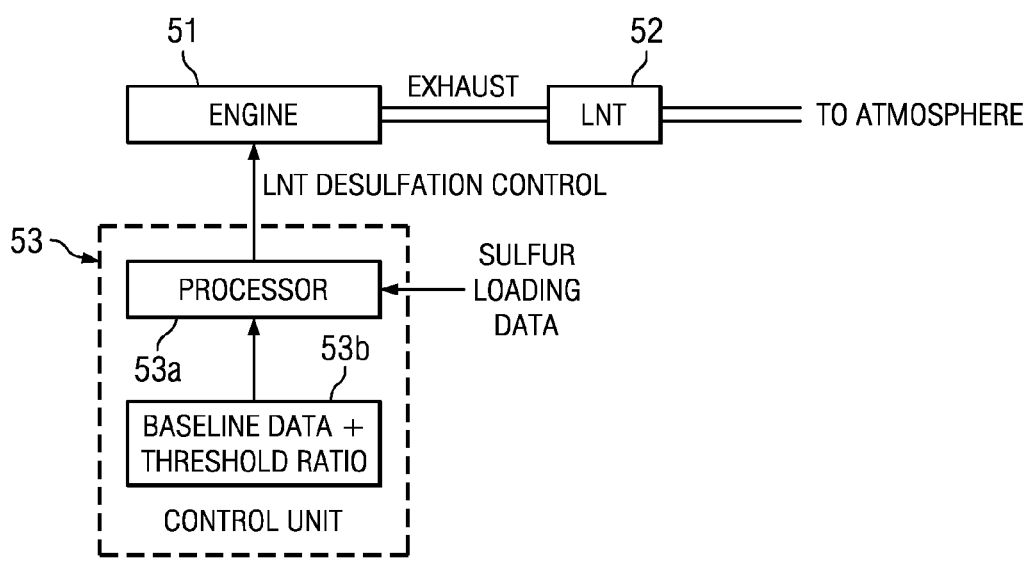
FIG. 5 illustrates how the method may be implemented with a control unit.

As illustrated in FIG. 5, the adaptive desulfation method can be implemented in a control unit 53 of a vehicle or other equipment having an engine 51 and an LNT 52. The control unit has appropriate processing hardware 53a, memory 53b and programming for implementing the method. It receives input representing the current LNT sulfur loading, and delivers control signals to commence and terminate desulfation events.

The stored data in memory 53b includes the baseline data, representing the NOx adsorption capacity of the LNT over its useful lifetime, and assuming a succession of desulfation events with a fixed sulfur loading amount. The stored data also includes the threshold ratio, calculated as described above.

During engine operation, the control unit's processor 53a is programmed to monitor the current sulfur loading and the current LNT capacity, and to calculate a variable trigger sulfur loading amount. As described above, this trigger amount varies with the LNT capacity over its lifetime. In the specific embodiment described herein, the processor receives data representing the current sulfur loading, accesses the baseline data to monitor the current NOx adsorption capacity, and calculates the trigger amount. The processor delivers appropriate control signals to perform a desulfation event when the current loading amount meets the trigger amount.

As indicated in the Background, an LNT also requires periodical regeneration to restore its NOx adsorption capacity due to NOx loading. LNT regeneration is achieved under rich exhaust conditions, without requiring high temperature used for desulfation. Generally, an LNT will require regeneration on a more frequent basis than desulfation.

The same adaptive method described above can be used for LNT regeneration during the lifetime of a particular LNT. For regeneration, baseline data is acquired to represent the LNT's NOx absorption capacity over time as illustrated in FIG. 1. The method of FIG. 4 and the system of FIG. 5 are similar as applied to regeneration rather than desulfation.

Similar calculations are performed as described above to obtain a threshold NOx loading amount and to calculate a trigger NOx loading amount, which determine when regeneration is required. More specifically, for regeneration, from the baseline LNT capacity data, the capacity, Np3, at Point 3 (the beginning of Zone III) is determined. In this case, Point 3 is the time at which the LNT's NOx adsorption capacity becomes stable. Next, an amount of NOx, NOXp3, appropriate to trigger a regeneration event is determined for this point. For example, criterion for determining the NOx loading amount, NOXp3, could be that NOx emission out of LNT are less than an defined upper limit in terms of its concentration, mass flow rate, or molar flow rate. And then, the threshold ratio, β, is defined as the ratio of NOXp3 to Np3. The trigger amount to determine when a regeneration event occurs is calculated from the current NOx adsorption capacity Np and the threshold ratio, β.

What is claimed is:

1. A method of controlling desulfation of a lean NOx trap (LNT), the LNT operable to adsorb NOx and to become loaded with a loading amount of sulfur until a desulfation event is performed, comprising:
    within a control unit,
        monitoring a current sulfur loading amount;
        monitoring a current NOx adsorption capacity; and
        using the current sulfur loading amount and the current NOx adsorption capacity to calculate a variable sulfur loading trigger amount; and
    operating an engine to perform a desulfation event when the current sulfur loading amount meets the variable sulfur loading trigger amount.

2. The method of claim 1, wherein the step of using the current loading amount and the current adsorption capacity is performed by: storing a set of baseline data, representing a NOx adsorption capacity of the LNT over its useful lifetime, assuming a succession of desulfation events with a fixed sulfur loading amount; storing a threshold ratio as the ratio of Sp3 to Np3; wherein Np3 is determined from the baseline data, and represents an adsorption capacity of the LNT when a desulfation event will result in the LNT being positively restored; and wherein Sp3 represents the amount of sulfur loading appropriate to trigger a desulfation event when the LNT is at capacity Np3; and calculating the trigger amount as the product of the threshold ratio times the current capacity.

3. A method of controlling desulfation of a lean NOx trap (LNT), the LNT operable to adsorb NOx and to become loaded with a loading amount of sulfur until a desulfation event is performed, comprising:
    within a control unit,
        storing a set of baseline data, representing a NOx adsorption capacity of the LNT over its useful lifetime, assuming a succession of desulfation events with a fixed sulfur loading amount;
        storing a threshold ratio as the ratio of Sp3 to Np3;
        wherein Np3 is determined from the baseline data, and represents an adsorption capacity of the LNT when a desulfation event will result in the LNT being positively restored;
        wherein Sp3 represents an amount of sulfur loading appropriate to trigger a desulfation event when the LNT is at capacity Np3;
        monitoring a current sulfur loading amount; and
        monitoring a current NOx adsorption capacity; and
    operating an engine to perform a desulfation event when the current sulfur loading amount meets the product of the threshold ratio times the current NOx adsorption capacity.

4. The method of claim 3, wherein Sp3 represents the sulfur loading amount at which sulfur-occupied adsorption sites of the LNT can be restored effectively by a desulfation event.

5. The method of claim 3, wherein Sp3 represents the sulfur loading amount wherein a desulfation event can be performed without LNT capacity loss due to excessive sulfur loading.

6. A system to control desulfation of a lean NOx trap (LNT), the LNT operable to adsorb NOx and to become loaded with a loading amount of sulfur until a desulfation event is performed, comprising:

memory for storing baseline data representing a NOx adsorption capacity of the LNT over its useful lifetime;

a processor programmed to receive data representing a current sulfur loading amount while the LNT is in use, and to receive baseline data from the memory representing a current adsorption capacity of the LNT;

a processor programmed to use the current sulfur loading amount and the current adsorption capacity to calculate a variable sulfur loading trigger amount; and to deliver control signals to perform a desulfation event when the current sulfur loading amount meets the variable sulfur loading trigger amount; and an engine configured to receive the control signals to perform the desulfation event.

7. The control unit of claim 6, wherein the baseline data represents the NOx adsorption capacity of the LNT over its useful lifetime, assuming a succession of desulfation events with a fixed sulfur loading amount.

8. The control unit of claim 6, wherein the memory stores a threshold ratio as the ratio of $Sp3$ to $Np3$, where $Np3$ is determined from the baseline data, and represents an adsorption capacity of the LNT when a desulfation event will result in the LNT being positively restored, and where $Sp3$ represents an amount of sulfur loading appropriate to trigger a desulfation event when the LNT is at capacity $Np3$; and wherein the processor is programmed to calculate the trigger amount as the product of the threshold ratio times the current capacity.

* * * * *